US008672112B2

(12) United States Patent
Ikeda et al.

(10) Patent No.: US 8,672,112 B2
(45) Date of Patent: Mar. 18, 2014

(54) DRIVE SYSTEM FOR VEHICLE

(75) Inventors: Minoru Ikeda, Nagoya (JP); Shinichi Ito, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 201 days.

(21) Appl. No.: 13/240,329

(22) Filed: Sep. 22, 2011

(65) Prior Publication Data

US 2012/0103751 A1    May 3, 2012

(30) Foreign Application Priority Data

Nov. 2, 2010  (JP) ................................. 2010-246864

(51) Int. Cl.
  *F16D 25/0638*  (2006.01)
  *F16D 48/02*  (2006.01)
(52) U.S. Cl.
  USPC ................. 192/85.25; 192/85.37; 192/106 F; 180/65.25; 903/914
(58) Field of Classification Search
  USPC ........... 192/85.27–85.28, 85.25, 85.37, 106 F
  See application file for complete search history.

(56) References Cited

U.S. PATENT DOCUMENTS

| 3,576,241 | A | * | 4/1971 | Maurice et al. | ............... | 192/85.3 |
| 5,172,799 | A | * | 12/1992 | Iijima et al. | ................ | 192/106 F |
| 5,630,492 | A | * | 5/1997 | Yoshikawa et al. | ........ | 192/106 F |
| 2005/0167234 | A1 | * | 8/2005 | Aoki et al. | .................. | 192/106 F |
| 2008/0121446 | A1 | * | 5/2008 | Sanji | ............................ | 180/65.2 |
| 2009/0100965 | A1 | | 4/2009 | Sanji et al. | | |
| 2011/0121692 | A1 | * | 5/2011 | Iwase et al. | .................. | 310/67 R |
| 2012/0118695 | A1 | * | 5/2012 | Kawashima et al. | ..... | 192/48.609 |
| 2012/0217122 | A1 | * | 8/2012 | Kasuya et al. | ........... | 192/113.35 |

FOREIGN PATENT DOCUMENTS

| JP | 2006-137406 A | 6/2006 |
| JP | 2009-101730 A | 5/2009 |
| JP | 2010-6190 A | 1/2010 |

* cited by examiner

*Primary Examiner* — Rodney Bonck
*Assistant Examiner* — Lillian Nguyen
(74) *Attorney, Agent, or Firm* — Buchanan Ingersoll & Rooney PC

(57) ABSTRACT

A drive system for a vehicle includes an engine, a transmission, a clutch mechanism including first and second clutch portions, the clutch mechanism being switchable between connected and disconnected states, and a clutch operation mechanism switching the clutch mechanism between the connected and disconnected states, the clutch operation mechanism including a clutch drum forming a drum chamber, a piston dividing the drum chamber into a spring chamber and a pressurizing chamber, a control valve, a biasing member arranged in the spring chamber and exerting a biasing force in a direction in which the first and second clutch portions are engaged with each other, and a bore formed in the clutch drum, the bore discharging oil of the spring chamber to an outer side of the spring chamber in a state where a counteracting force against a centrifugal force acting in the pressurizing chamber is generated in the spring chamber.

9 Claims, 6 Drawing Sheets

DRIVE SYSTEM FOR VEHICLE

CROSS REFERENCE TO RELATED APPLICATIONS

This application is based on and claims priority under 35 U.S.C. §119 to Japanese Patent Application 2010-246864, filed on Nov. 2, 2010, the entire content of which is incorporated herein by reference.

TECHNICAL FIELD

This disclosure relates to a drive system for a vehicle.

BACKGROUND DISCUSSION

A known drive system for a vehicle disclosed in each of JP2009-101730A, JP2006-137406A, and JP2010-6190A (hereinafter referred to as References 1, 2, and 3) includes a transmission to which a driving force of an engine is transmitted from an output shaft of the engine, and a clutch mechanism arranged between the output shaft of the engine and an input shaft of the transmission. According to the drive system disclosed in each of References 1, 2, and 3, the clutch mechanism includes a first clutch portion arranged at the output shaft of the engine, and a second clutch portion arranged at the input shaft of the transmission. The clutch mechanism is switchable between a connected state where the first and second clutch portions are engaged with each other to thereby transmit the driving force of the engine to the transmission and a disconnected state where the first and second clutch portions are disengaged from each other to thereby block the transmission of the driving force of the engine to the transmission.

According to the drive system disclosed in each of References 1, 2, and 3, when the clutch mechanism is brought into the connected state or into the disconnected state under a condition where the input shaft of the transmission is in rotation, a hydraulic pressure caused by a centrifugal force due to the rotation (hereinafter, the hydraulic pressure caused by the centrifugal force due to the rotation will be referred to as a centrifugal hydraulic pressure) may influence operational responsiveness of the clutch mechanism when the clutch mechanism shifts between the connected and disconnected states. As a result, improvement of the operational responsiveness of the clutch mechanism may be limited. In addition, the centrifugal hydraulic pressure due to the rotation is influenced by a rotating speed of the input shaft. Accordingly, the operational responsiveness of the clutch mechanism may be influenced by a moving speed of the vehicle, therefore limiting the improvement of the operational responsiveness of the clutch mechanism.

A need thus exists for a drive system for a vehicle, which is not susceptible to the drawback mentioned above.

SUMMARY

According to an aspect of this disclosure, a drive system for a vehicle includes an engine having an output shaft, a transmission including an input shaft to which a driving force of the output shaft of the engine is transmitted, the transmission transmitting the driving force to driving wheels of the vehicle, a clutch mechanism including a first clutch portion arranged between the output shaft of the engine and the input shaft of the transmission and positioned at the output shaft, and a second clutch portion arranged at the input shaft, the clutch mechanism being switchable between a connected state where the first clutch portion and the second clutch portion are engaged with each other to transmit the driving force of the engine to the transmission and a disconnected state where the first clutch portion and the second clutch portion are disengaged from each other to block the transmission of the driving force of the engine to the transmission, and a clutch operation mechanism switching the clutch mechanism between the connected state and the disconnected state by supply and discharge of oil to and from the clutch mechanism, the clutch operation mechanism including a clutch drum supported by the input shaft or the output shaft and having a cylindrical shape to form a drum chamber, a piston dividing the drum chamber of the clutch drum into a spring chamber generating a driving force for engaging the first clutch portion and the second clutch portion with each other, and a pressurizing chamber generating a driving force for disengaging the first clutch portion and the second clutch portion from each other, a control valve being switchable between a first position allowing the supply of the oil to the spring chamber and a second position allowing the supply of the oil to the pressurizing chamber, a biasing member arranged in the spring chamber and exerting a biasing force in a direction in which the first clutch portion and the second clutch portion are engaged with each other, and a bore formed in the clutch drum to establish a connection between inner and outer sides of the spring chamber, the bore discharging the oil of the spring chamber from the inner side to the outer side in a state where a counteracting force against a centrifugal force acting in the pressurizing chamber is generated in the spring chamber.

According to another aspect of the disclosure, a drive system for a vehicle includes an input member rotatably connected to a drive source, a shaft member arranged coaxially with the input member along a rotational axis of the input member and connected to a transmission, first clutch portions movably engaged with one of the input member and the shaft member along the rotational axis, second clutch portions arranged in an alternating manner with the first clutch portions and being engageable with and disengageable from the first clutch portions, the second clutch portions being movably engaged with the other one of the input member and the shaft member along the rotational axis, a clutch drum supported by the input member or the shaft member and including a bore positioned away from the rotational axis by a predetermined length in a radial direction, the clutch drum connecting to an outer side via the bore, a piston slidably fitted to the clutch drum along the rotational axis and including a pressing portion pressing the first clutch portions and the second clutch portions, a biasing member arranged between the piston and the clutch drum and biasing the piston toward the first clutch portions and the second clutch portions, the biasing member firmly pressing the first clutch portions and the second clutch portions against one another by the pressing portion, a pressurizing chamber defined between the clutch drum and a first axial end surface of the piston, and a spring chamber defined between the clutch drum and a second axial end surface of the piston, the piston separating from the first clutch portions and the second clutch portions against a biasing force of the biasing member by a hydraulic pressure of oil supplied to the pressurizing chamber, the oil being supplied to the spring chamber and discharged therefrom through the bore of the clutch drum to an outer side of the spring chamber.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
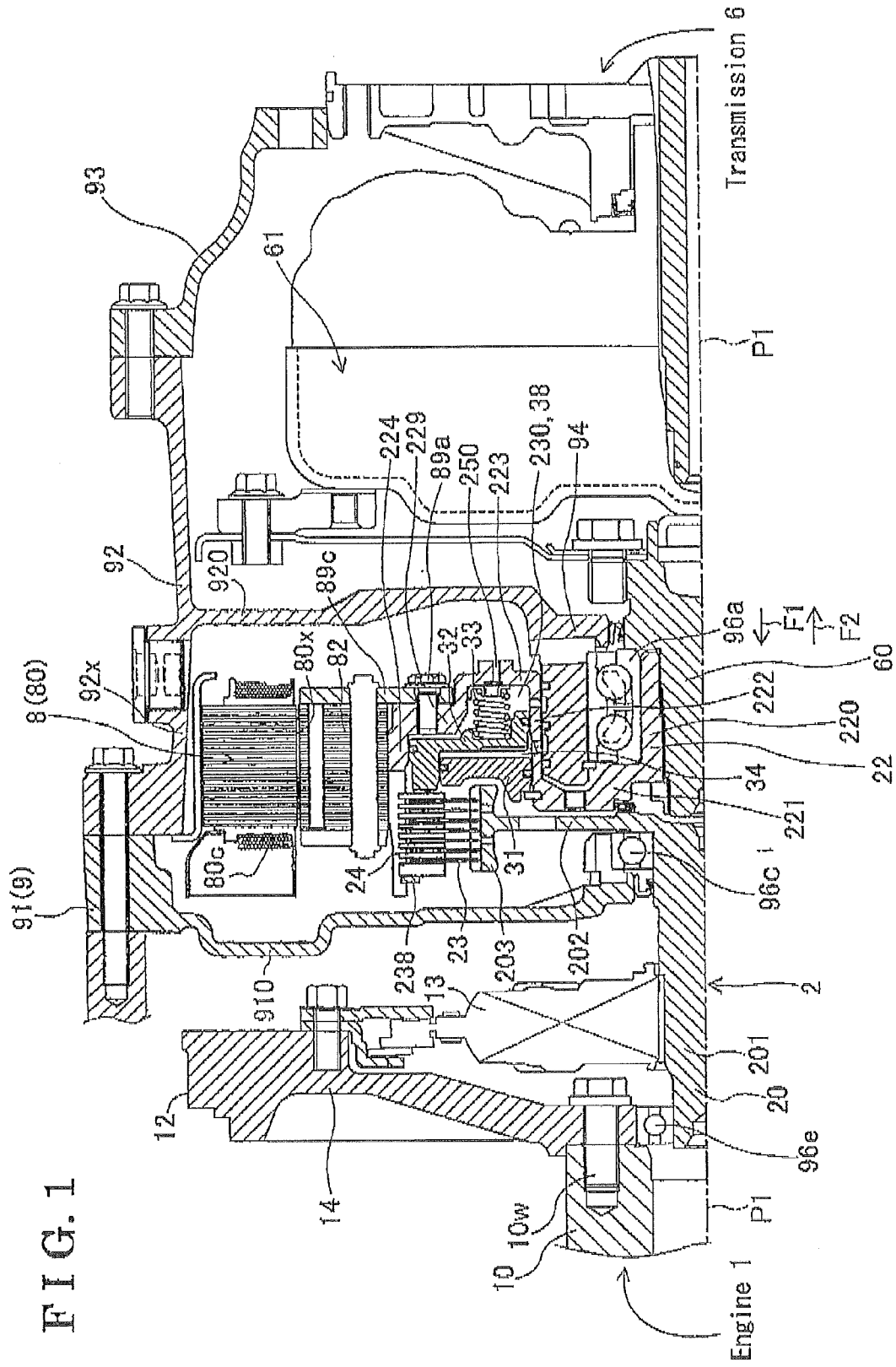
FIG. 1 is cross sectional view illustrating an upper half portion of a drive system for a vehicle, according to a first embodiment disclosed here.
Figure 2:
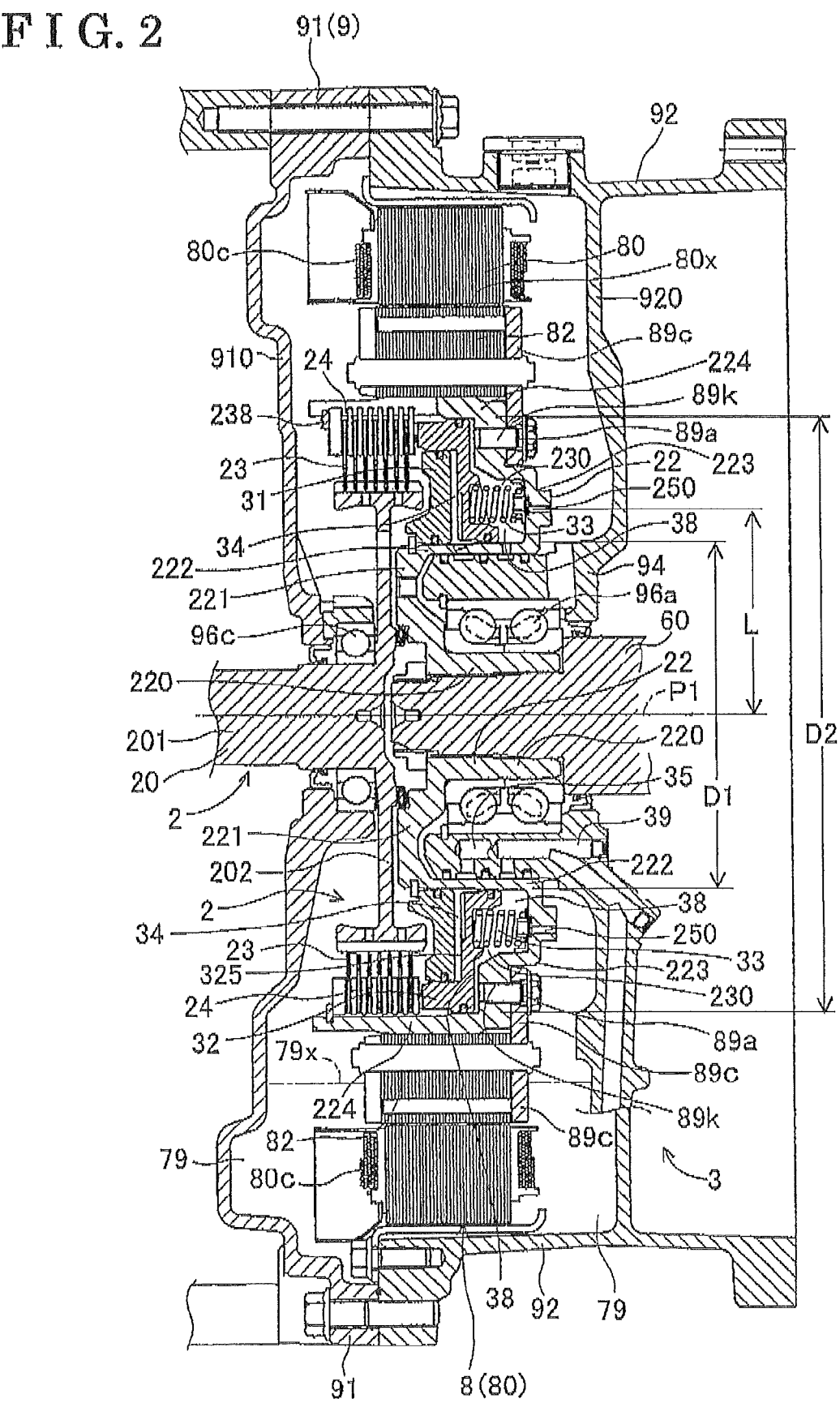
FIG. 2 is a cross sectional view illustrating a portion in the vicinity of a clutch mechanism of the drive system according to the first embodiment disclosed here.
Figure 3:
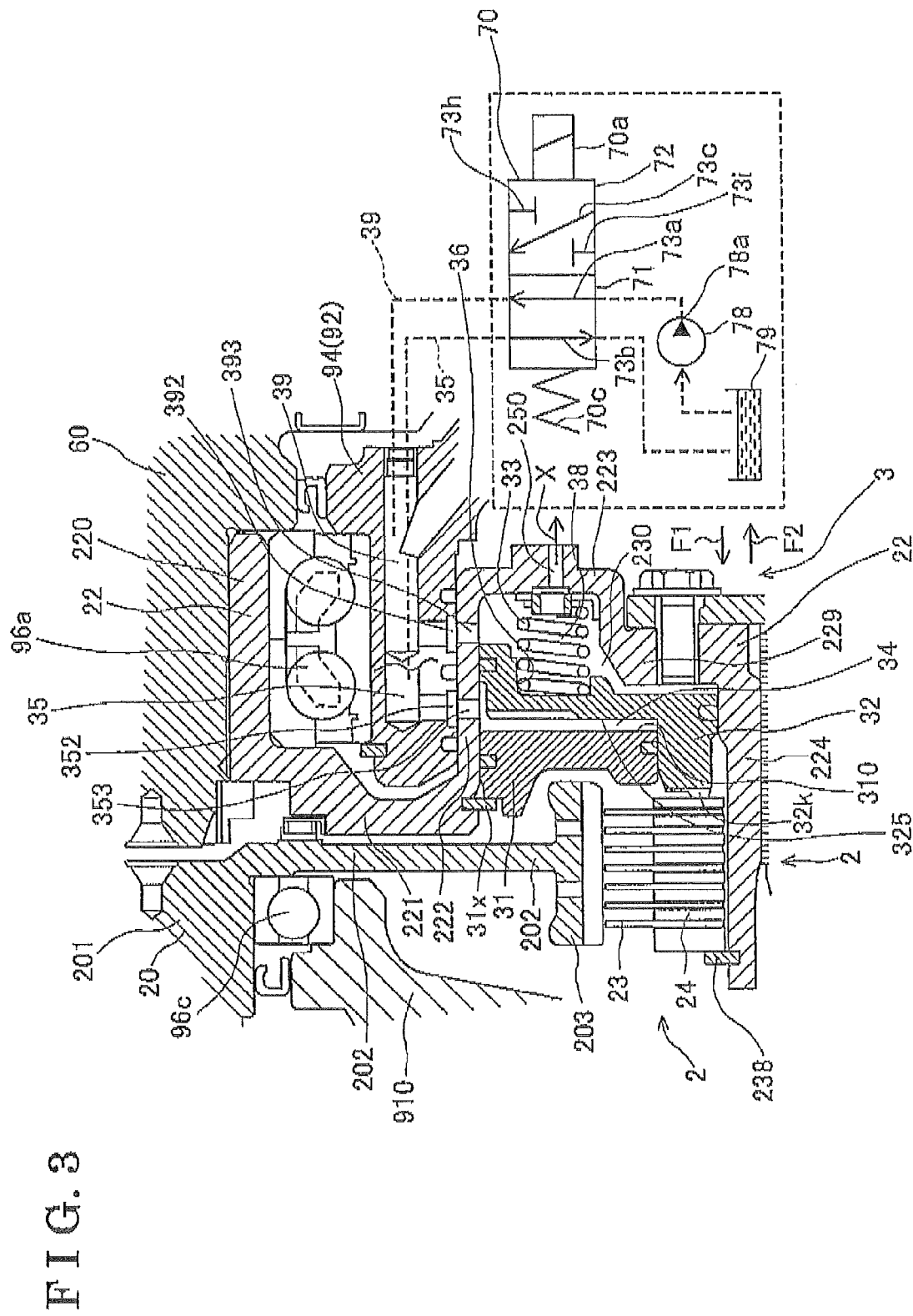
FIG. 3 is a partial cross sectional view illustrating a portion in the vicinity of a pressurizing chamber and a spring chamber that are in a clutch drum of the drive system according to the first embodiment disclosed here.
Figure 4:
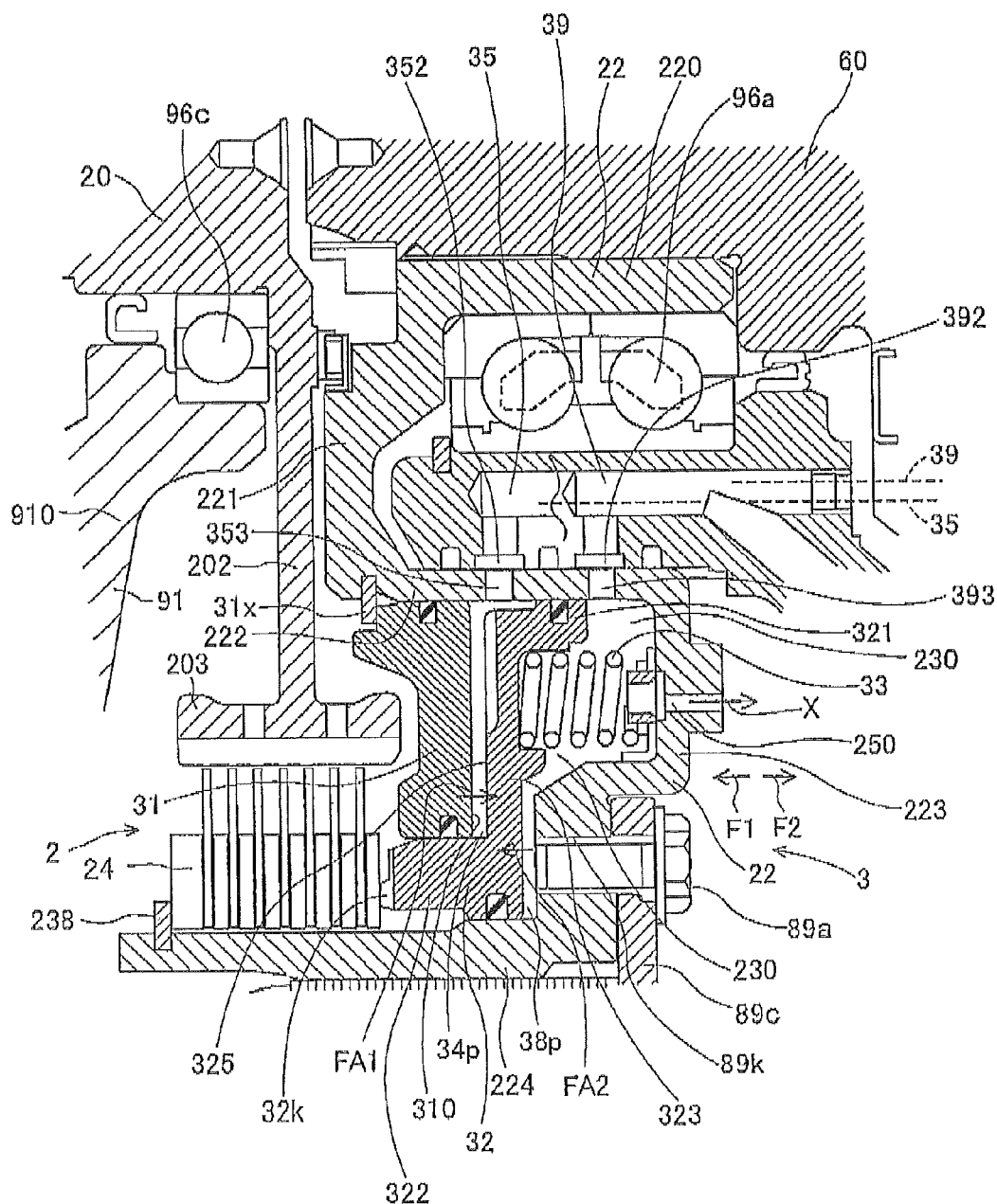
FIG. 4 is an enlarged cross sectional view illustrating the portion in the vicinity of the pressurizing chamber and the spring chamber that are in the clutch drum of the drive system according to the first embodiment disclosed here.
Figure 5:
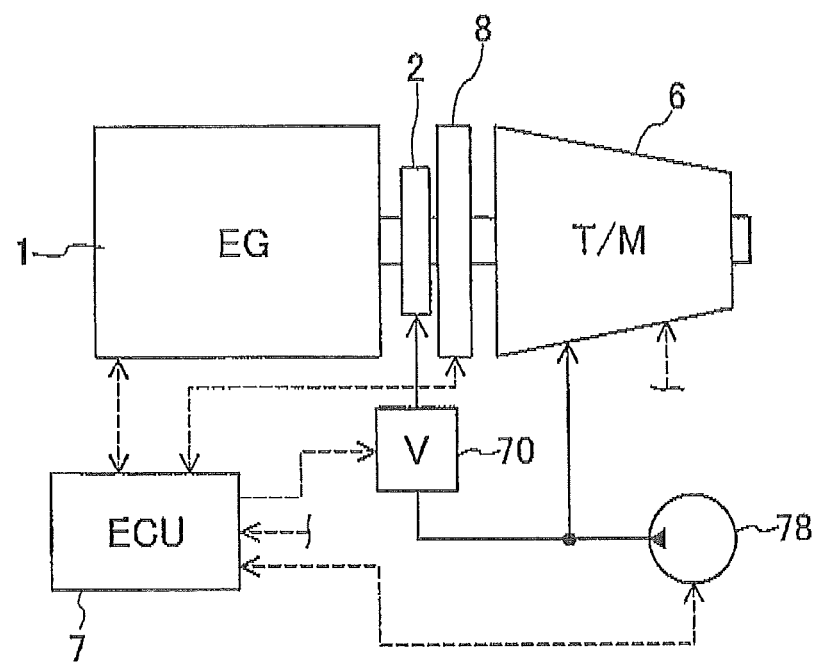
FIG. 5 is a block diagram of the drive system according to the first embodiment disclosed here.

A first embodiment of this disclosure is applied to a hybrid vehicle, for example, a hybrid passenger vehicle, a large-sized hybrid vehicle, and the like. The first embodiment of the disclosure will be explained with reference to the attached drawings. FIG. 1 is a cross sectional view illustrating an upper half portion of a drive system for a vehicle, according to the first embodiment. FIG. 2 is a cross sectional view illustrating a portion in the vicinity of a clutch mechanism 2 of the drive system according to the first embodiment. Each of FIGS. 3 and 4 is an enlarged view illustrating a main portion of a lower half portion of the drive system according to the first embodiment. FIG. 5 is a block diagram of the drive system according to the first embodiment. As illustrated in FIG. 5, the drive system includes an engine 1 serving as a drive source, the clutch mechanism 2, and a drive motor 8 (hereinafter referred to as a motor) formed by an electric motor for driving the vehicle, a transmission 6, and a control unit 7 (hereinafter referred to as an ECU). The ECU 7 controls the engine 1, the motor 8, the transmission 6, a control valve 70, and an oil pump 78. The motor 8 functions as a generator regenerating electric power when the vehicle decelerates or in other cases. According to the first embodiment, various configurations to increase an electric power regeneration efficiency of the motor 8 are adapted to the drive system. The oil pump 78 serving as an oil supply source is an electric pump, therefore supplying oil (lubricant) to the clutch mechanism 2 and the transmission 6 even in a case where the engine 1 is not in operation. In FIG. 5, solid arrows indicate hydraulic passages connecting to the oil pump and dashed arrows indicate signal lines connecting to ECU 7.

As illustrated in FIG. 1, the engine 1 includes an output shaft 10 and a flywheel 14. The output shaft 10 is rotated by a driving force of the engine 1 around a rotational axis P1 of an input member 20 of the clutch mechanism 2 that will be described below (the rotational axis P1 of the input member 20 corresponds to a rotational axis of an input shaft 60 of the transmission 6). The flywheel 14 formed in a ring shape is coaxially connected to the output shaft 10 by means of an attachment member 10w. A ring gear 12 formed at an outer circumferential portion of the flywheel 14 engages with a drive shaft of a starter motor. The starter motor is brought in operation, thereby rotating the flywheel 14. A torque converter 61 arranged at the transmission 6 includes the input shaft 60 serving as a shaft member rotated by the driving force of the output shaft 10 of the engine 1. The input shaft 60 is mechanically connected via a transmission gear mechanism of the transmission 6 to driving wheels of the vehicle, thereby rotating the driving wheels.

The clutch mechanism 2 will be explained as follows. The clutch mechanism 2 configuring a wet multiplate clutch includes the input member 20, a clutch drum 22, friction plates 23 supported by the input member 20 and serving as first clutch portions, and separate plates 24 supported by the clutch drum 22 and serving as second clutch portions. The friction plates 23 and the separate plates 24 are arranged in an alternating manner so as to face one another in the direction of the rotational axis P1. The friction plates 23 and the separate plates 24 may be firmly pressed against one another so as to be brought into an engaged state (connected state). In addition, the friction plates 23 and the separate plates 24 that are in the engaged state are separated from one another so as to be brought into a disengaged state (disconnected state).

The friction plates 23, the separate plates 24, the input member 20, and the clutch drum 22 are coaxially arranged with one another around the rotational axis P1. The input member 20 is connected by a damper 13 to the flywheel 14. The engine 1 is brought into operation, therefore integrally rotating the output shaft 10, the flywheel 14, the damper 13, the input member 20, and the friction plates 23 with one another around the rotational axis P1.

As illustrated in FIG. 1, the input member 20 includes a shaft portion 201, an extending portion 202, and a supporting portion 203. The shaft portion 201 is arranged coaxially with the output shaft 10. The extending portion 202 having a ring shape formed around the rotational axis P1 extends radially outwardly from an axial end of the shaft portion 201, which axial end is in the vicinity of the transmission 6. The supporting portion 203 supports the friction plates 23 and has a ring shape formed around the rotational axis P1. The plural friction plates 23 are fitted to an outer circumferential portion of the supporting portion 203 so as to be restricted from rotating relative to one another and so as to move relative to one another along the rotational axis P1.

As illustrated in FIG. 1, the clutch drum 22 includes a fixed cylindrical portion 220, a first extending portion 221, a radially-inward cylindrical portion 222, a second extending portion 223, and a radially-outward cylindrical portion 224. The fixed cylindrical portion 220 spline-fitted to an outer circumferential portion of the input shaft 60 of the transmission 60 integrally rotates with the input shaft 60. The first extending portion 221 extends radially outwardly from an axial end of the fixed cylindrical portion 220, which axial end is in the vicinity of the engine 1. The radially-inward cylindrical portion 222 extends from a radially outward end of the first extending portion 221 toward the transmission 6 along the rotational axis P1. The second extending portion 223 extends radially outwardly from an axial end of the radially-inward cylindrical portion 222, which axial end is in the vicinity of the transmission 6. The radially-outward cylindrical portion 224 extends from a radially outward end of the second extending portion 223 toward the clutch mechanism 2 along the rotational axis P1. The plural separate plates 24 are fitted to an end of the radially-outward cylindrical portion 224 so as to be restricted from rotating relative to one another and so as to move relative to one another along the rotational axis P1. A drum chamber 230 is formed by the radially-inward cylindrical portion 222, the second extending portion 223, and the radially-outward cylindrical portion 224. Here, the fixed cylindrical portion 220, the radially-inward cylindrical portion 222, the radially-outward cylindrical portion 224, and the drum chamber 230 that form the clutch drum 22 are formed so as to surround the rotational axis P1. A piston 32 of a clutch operation mechanism 3 that will be described below is slidably or movably arranged in the drum chamber 230 so as to make contact with a piston stopper 229 of the clutch drum 22. The piston 32 divides the drum chamber 230 into a pressurizing chamber 34 and a spring chamber 38. Bores 250 connecting inner and outer sides of the spring chamber 38 to each other are formed in the second extending portion 223 so as to be arranged in the vicinity of the transmission 6 relative to the clutch mechanism 2. Each of the bores 250 functions to reduce a flow rate of the oil. As illustrated in FIG. 2, a length between the rotational axis P1 and an axial center of the bore 250 in a radial direction of the clutch drum 22 is defined as a length L (predetermined length).

The clutch mechanism 2 is switchable between the connected state where the driving force of the engine 1 is being transmitted to the input shaft 60 of the transmission 6 and the disconnected state where the transmission of the driving force of the engine 1 to the input shaft 60 is blocked. Under a condition where the clutch mechanism 2 is in the connected state, the friction plates 23 adjoining the separate plates 24 are firmly pressed against one another so as to be engaged with one another, thereby transmitting the driving force of the engine 1 to the input shaft 60 of the transmission 6. Meanwhile, under a condition where the clutch mechanism 2 is in the disconnected state, the friction plates 23 and the separate plates 24 are released from the engaged state, thereby blocking the transmission of the driving force of the engine 1 to the transmission 6. The clutch mechanism 2 is a normally closed clutch. Under a condition where the clutch mechanism 2 is in a normal state where the driving force of the engine 1 is being transmitted to the transmission 6, the piston 32 moves by biasing forces of biasing members 33 of the clutch operation mechanism 3 toward the engine 1 along the rotational axis P1. Accordingly, the friction plates 23 and the separate plates 24 are firmly pressed against one another so as to be maintained in the engaged state. Consequently, in the case that the clutch mechanism 2 is in the normal state, a hydraulic pressure of the oil for firmly pressing the friction plates 23 and the separate plates 24 against one another is not needed, therefore effectively saving energy. Additionally, for example, even in a case where any defect occurs in a hydraulic system, the friction plates 23 and the separate plates 24 that form the clutch mechanism 2 are firmly pressed against one another so as to be in the connected state. As a result, the driving force of the engine 1 may be transmitted to the transmission 6, thereby bringing the vehicle into motion.

The clutch operation mechanism 3 for operating the clutch mechanism 2 will be described as follows. As illustrated in FIG. 3, the clutch operation mechanism 3 includes a fixed plate 31, the piston 32, the biasing members 33, the pressurizing chamber 34, and an oil passage 35 that connects to the pressurizing chamber 34. The fixed plate 31 is fixed to a fixing groove of an outer circumferential side of the radially-inward cylindrical portion 222 of the clutch drum 22 by a fixing member 31x having a C-ring shape. The fixed plate 31 has a surface 310 facing an opposite direction to the clutch mechanism 2. The piston 32 is movably or slidably fitted in the drum chamber 230 along the rotational axis P1. The piston 32 has a pressure surface 325 facing the clutch mechanism 2 and corresponding to a first axial end surface. The biasing members 33 formed by biasing members including coils are arranged between the piston 32 and the second extending portion 223 of the clutch drum 22. The pressurizing chamber 34 is formed between the surface 310 of the fixing plate 31 and the pressure surface 325 of the piston 32. In particular, the pressurizing chamber 34 is defined between the clutch drum 22 and the pressure surface 325 (first axial end surface) of the piston 32. The pressurizing chamber 34, the piston 32, and the drum chamber 230 are formed to have ring shapes around the rotational axis P1. The plural biasing members 33 are circumferentially arranged at substantially equal intervals around the rotational axis P1 in the drum chamber 230. The fixed plate 31 constitutes a portion of the clutch drum 22.

As illustrated in FIG. 4, the piston 32 includes a radially-inward cylindrical movable portion 321, a radially-outward cylindrical movable portion 322, and a pressure portion 323 that connects the radially-inward cylindrical movable portion 321 to the radially-outward cylindrical movable portion 322 along a radial direction of the piston 32. The radially-inward cylindrical movable portion 321 and the radially-outward cylindrical movable portion 322 are formed coaxially with each other. For example, the piston 32 moves in a direction indicated by an arrow F1 seen in FIG. 3 (the direction of the arrow F1 will be hereinafter referred to as the direction F1 and the direction F1 corresponds to an engagement direction to bring the clutch mechanism 2 into the connected state). As a result, a pressing portion 32k of the radially-outward cylindrical movable portion 322 of the piston 32 moves the separate plates 24 toward the friction plates 23, thereby firmly pressing the separate plates 24 against the friction plates 23 (see in FIG. 3). On the other hand, for example, the piston 32 moves in a direction indicated by an arrow F2 seen in FIG. 3 (the direction of the arrow F2 will be hereinafter referred to as the direction F2 and the direction F2 corresponds to a disengagement direction to release the clutch mechanism 2 from the engaged state). As a result, the radially-outward cylindrical movable portion 322 of the piston 32 separates from the separate plates 24, thereby releasing the frictional plates 23 and the separate plates 24 from the engaged state.

As illustrated in FIG. 3, first ends of the biasing members 33 are seated at the second extending portion 223 of the clutch drum 22 and second ends of the biasing members 33 are seated at a biasing member supporting a recessed portion 36 formed at an axial end surface (second axial end surface) of the piston 32, which axial end surface faces the transmission 6 along the rotational axis P1. Thus, the biasing members 33 are inhibited from loosening from the clutch drum 22. As seen from FIG. 3, the biasing members 33 bias the piston 32 toward the fixing plate 31 in the direction F1. Accordingly, when the hydraulic pressure is not applied to the pressurizing chamber 34, the piston 32 moves toward the clutch mechanism 2 in the direction F1 (in the engagement direction to bring the clutch mechanism 2 into the connected state). Consequently, the frictional plates 23 and the separate plates 24 are firmly pressed against one another, therefore bringing the clutch mechanism 2 into the connected state. According to the drive system of the first embodiment, in the case of the electric power regeneration by the motor 8, the clutch mechanism 2 is shifted from the connected state to the disconnected state to therefore block the transmission of the driving force of the engine 1 to the transmission 6. As a result, the electric power regeneration efficiency of the motor 8 may be increased.

As illustrated in FIG. 3, the oil passage 35 and an oil passage 39 are formed in the clutch operation mechanism 3. The clutch operation mechanism 3 is further provided with the control valve 70. The oil is supplied/discharged from/to the pressurizing chamber 34 through the oil passage 35 connecting to the pressurizing chamber 34. The oil is supplied/discharged to/from the spring chamber 33 through the oil passage 39 connecting to the spring chamber 38. The oil passage 35 is formed within a fixing cylindrical portion 94 of a second case 92 constituting a portion of a case 9 that will be described below. The oil passage 35 includes an annular groove 352 and a through hole 353. The annular groove 352 is formed at a first end of the oil passage 35 so as to have an opening relative to an outer circumferential surface of the fixing cylindrical portion 94. The through hole 353 penetrates through the radially-inward cylindrical portion 222 in a thickness direction of the clutch drum 22 and has an opening relative to the annular groove 352. The oil passage 39 is formed within the fixing cylindrical portion 94 of the second case 92 of the case 9. The oil passage 39 includes an annular groove 392 and a through hole 393. The annular groove 392 is formed at a first end of the oil passage 39 so as to have an opening relative to the outer circumferential surface of the fixing cylindrical portion 94. The through hole 393 penetrates through the radially-inward cylindrical portion 222 in the thickness direction of the clutch drum 22 and has an opening relative to the annular groove 392. As illustrated in FIG. 3, respective second ends of the oil passage 35 and the oil passage 39 are connected via the control valve 70 to the oil pump 78. The control valve 70 is switchable between first and second positions 71 and 72 by a solenoid 70a and a biasing member 70c.

The first position 71 is a position to bring the clutch mechanism 2 into the connected state. The first position 71 includes a passage 73a connecting a discharge port 78a of the oil pump 78 to the oil passage 39, and a passage 73b connecting the oil passage 35 to an oil storing portion 79. The second position 72 is a position to bring the clutch mechanism 2 into the disconnected state. The second position 72 includes a passage 73c connecting the discharge port 78a of the oil pump 78 to the oil passage 35, and closing ports 73h and 73i. In a case where the control valve 70 is shifted to the first position 71 by the ECU 7 when the oil pump 78 is in operation, the oil is supplied from the discharge port 78a through the passage 73a, the oil passage 39, the annular groove 392, and the through hole 393 to the spring chamber 38, thereby increasing the hydraulic pressure in the spring chamber 38. Consequently, the piston 82 is moved by the hydraulic pressure of the spring chamber 38 in the direction F1 (see FIG. 3), therefore bringing the clutch mechanism 2 into the connected state. In such case, the oil in the pressurizing chamber 34 is discharged therefrom through the passage 73b to the oil storing portion 79.

Meanwhile, in a case where the control valve 70 is shifted to the second position 72 by the ECU 7, the pressurizing chamber 34 establishes a connection via the oil passage 35 and the passage 73c to the discharge port 78a of the oil pump 78. Accordingly, the oil of the oil pump 78 is supplied through the discharge port 78a, the passage 73c, the oil passage 35, the annular groove 352, and the through hole 353 to the pressurizing chamber 34, thereby increasing the hydraulic pressure in the pressurizing chamber 34. Consequently, the piston 32 is moved by the hydraulic pressure of the pressurizing chamber 34 in the direction F2 (see FIG. 3), therefore bringing the clutch mechanism 2 into the disconnected state. In such case, the oil passage 39 connecting to the spring chamber 38 is closed by the closing port 73h. Therefore, the oil in the spring chamber 38 does not flow to the control valve 70. Then, the oil of the spring chamber 38 is discharged therefrom through each of the bores 250 in a direction indicated by an arrow X seen in FIG. 3 (the direction will be hereinafter referred to as the direction X), thereafter being stored in the oil storing portion 79 (see FIG. 2). As illustrated in FIG. 2, an opening diameter of the bore 250 and the length L (see FIG. 2) affect a discharge rate of the oil being discharged from the spring chamber 38. The opening diameter of the bore 250 and the length L further affect a centrifugal hydraulic pressure in the spring chamber 38, operational responsiveness of the clutch mechanism 2 when the clutch mechanism 2 shifts from the connected state to the disconnected state, and the electric power regeneration efficiency of the motor 8. In addition, the oil pump 78 is the electric pump as described above, therefore supplying the oil to the pressurizing chamber 34 regardless of whether the engine 1 is in operation. Moreover, according to the drive system of the first embodiment, the control valve 70 may be accommodated in the case 9. Alternatively, the control valve 70 may be arranged at an outer side of the case 9.

As described above, the clutch mechanism 2 is the normally closed clutch. In the case that the clutch mechanism 2 is in the normal state, the friction plates 23 adjoining the separate plates 24 are firmly pressed against one another by the biasing forces of the biasing members 33 and are engaged with one another, therefore bringing the clutch mechanism 2 into the connected state. Accordingly, the output shaft 10 of the engine 1 is connected to the input shaft 60 of the transmission 6 by the clutch mechanism 2. In such case, for example, the engine 1 is in operation to therefore rotate the output shaft 10. Accordingly, the input member 20, and the friction plates 23 and the separate plates 24 that are in the engaged state rotate about the rotational axis P1. In addition, the clutch drum 22 rotates together with a rotor 82 of the motor 8 and a rotating force of the rotor 82 is transmitted to the input shaft 60 to thereby rotate the input shaft 60 of the transmission 6, therefore rotating the driving wheels of the vehicle.

On the other hand, in the case of blocking of the transmission of the driving force of the engine 1 to the transmission 6, the oil is supplied to the pressurizing chamber 34 by the operation of the oil pump 78. Then, the hydraulic pressure of the pressurizing chamber 34 for blocking the transmission of the driving force of the engine 1 to the transmission 6 (the hydraulic pressure of the pressurizing chamber 34 corresponds to a driving force for bringing the friction plates 23 and the separate plates 24 into the disengaged state) becomes larger than the sum of the biasing forces of the biasing members 33 and the hydraulic pressure of the spring chamber 38; therefore, the piston 32 moves in the direction F2. In such case, the separate plates 24 are movable in the direction F2. Accordingly, the friction plates 23 and the separate plates 24 configuring the clutch mechanism 2 and adjoining one another separate from one another, therefore being brought into the disengaged state (disconnected state). As a result, the clutch mechanism 2 is shifted from the connected state to the disconnected state. Thus, the connection between the engine 1 and the transmission 6 is blocked; therefore, the driving force of the output shaft 10 of the engine 1 is not transmitted to the input shaft 60 of the transmission 6. Here, as illustrated in FIG. 4, a centrifugal hydraulic pressure FA1 in the pressurizing chamber 34 and a centrifugal hydraulic pressure FA2 (corresponding to a counteracting force against a centrifugal force acting in the pressurizing chamber 34) in the spring chamber 38 act in opposite directions from each other and offset each other or decrease. In such case, the oil is supplied to the pressurizing chamber 34 by the control valve 70, thereby smoothly moving the piston 32 in the direction F2. Consequently, the clutch mechanism 2 is promptly shifted from the connected state to the disconnected state in reaction to the hydraulic pressure from the pressurizing chamber 34. At this time, the engine 1 may be quickly disconnected from the motor 8, therefore increasing the electric power regeneration efficiency of the motor 8.

As illustrated in FIGS. 1 and 2, in the case that the clutch mechanism 2 is maintained in the connected state, a distance of an inner space of the pressurizing chamber 34 along the rotational axis P1 is designed to be short and a radial distance of the inner space of the pressurizing chamber 34 is designed to be long, that is, the pressurizing chamber 34 is thinned so as to have a flattened shape. Accordingly, a capacity of the pressurizing chamber 34 may be minimized and a large area of the pressure surface 32s of the piston 32 may be obtained. Therefore, an operating force of the piston 32 for blocking the transmission of the driving force of the engine 1 to the transmission 6 is increased. Consequently, the oil is supplied to the pressurizing chamber 34; thereby, the operational responsiveness of the clutch mechanism 2 when the clutch mechanism 2 shifts from the connected state to the disconnected state may be increased. As a result, in the case where the motor 8 is utilized as the generator so as to regenerate the electric power, the clutch mechanism 2 may be quickly shifted from the connected state to the disconnected state and the motor 8 driving the vehicle may promptly shifts to the generator generating the electric power. Therefore, a volume of the electric power being stored in an electric storage device may be increased, resulting in improvement of fuel efficiency of the vehicle.

According to the drive system of the first embodiment, each of the biasing members 33 biasing the piston 32 may be formed by a plate or disk shaped biasing member. However, the plate or disk shaped biasing member is easily deformed; therefore, a load of the plate or disk shaped biasing member tends to vary in a substantially quadratic curve form. In such case, a torque capacity of the clutch mechanism 2 may not be secured, for example, in an occurrence of aging deteriorations or abrasions of the friction plates 23 and the separate plates 24 configuring the clutch mechanism 2. Further, in a case where the load of the plate or disk shaped biasing member drastically varies, torque being transmitted from the output shaft 10 to the clutch mechanism 2 may not be easily controlled by supplying the oil to the pressurizing chamber 84 to therein control the hydraulic pressure. On the other hand, the biasing member 33 formed by the biasing member including the coil is deformed; thereafter, a load of the biasing member 33 linearly varies compared to the plate or disk shaped biasing member. In such case, the torque being transmitted from the output shaft 10 to the clutch mechanism 2 may be precisely controlled by controlling the hydraulic pressure of the pressurizing chamber 34. In addition, the biasing member 33 including the coil may be easily arranged in a small space and the plural biasing members 33 may be arranged in the drum chamber 230 of the clutch mechanism 2. Accordingly, the sum of the loads of the biasing members 33 increases; therefore, the clutch mechanism 2 may be maintained in the connected state by the large loads of the biasing members 33. As described above, although the biasing members 33 are formed by the biasing members including the coils in the drive system according to the first embodiment, the biasing members 33 may be formed by the plate or disk shaped biasing members according to needs.

As illustrated in FIG. 1, the motor 8 is arranged in a drivetrain connecting the clutch mechanism 2 to the transmission 6. The motor 8 includes a stator 80 and the rotor 82. The stator 80 fixed to an inner circumferential portion of the second case 92 includes an excitation wiring 80c wound around an iron core. The rotor 82 is coaxially arranged with the stator 80 in a state where a clearance 80x is generated between the stator 80 and the rotor 82 at a radially inward side of the stator 80. The rotor 82 is fixed to an outer circumferential portion of the radially-outward cylindrical portion 224 of the clutch drum 22 by means of attachment members 89a and a bracket 89c, thereby integrally rotating with the clutch drum 22 around the rotational axis P1. An excitation current is applied to the excitation wiring 80c; therefore, a rotating magnetic field is generated around the rotational axis P1. As a result, the rotor 82, the clutch drum 22, and the input shaft 60 of the transmission 6 rotate, therefore rotating the driving wheels via the transmission 6.

As illustrated in FIG. 1, the case 9 accommodates the clutch mechanism 2, the clutch operation mechanism 3, the motor 8, the torque converter 61, and the like. The case 9 includes a first case 91, the second case 92 connected to the first case 91, a third case 93 connected to the second case 92 in the mentioned order as seen from the engine 1 to the transmission 6 along the rotational axis P1. The first case 91 includes a first wall 910 extending radially inwardly. The second case 92 includes a second wall 920 extending radially inwardly and the fixing cylindrical portion 94 formed at a radially inward portion of the second wall 920 so as to extend along the rotational axis P1. As illustrated in FIG. 1, the clutch drum 22 is arranged in the case 9 so as to be fixed therein by the fixing cylindrical portion 94. A bearing 96a supporting the clutch drum 22 so that the clutch drum 22 is rotatable is arranged between the fixing cylindrical portion 94 and the clutch drum 22, thereby smoothly rotating the clutch drum 22. The bearing 96a is provided at a position corresponding a position in which the piston 32 is arranged in the direction of the rotational axis P1 (see FIGS. 1 and 2); thereby, an axial length of the case 9 may be reduced. Additionally, the oil passages 35 and 39 that shift the clutch mechanism 2 between the connected and disconnected states are formed in the fixing cylindrical portion 94, thereby reducing the size and cost of the drive system.

As illustrated in FIG. 1, the stator 80 of the motor 8 is fixed to an inner circumferential portion of an outer-circumferential-wall cylindrical portion 92x of the second case 92. The first wall 910 and the second wall 920 face each other along the rotational axis P1. The bearing 96a is arranged between the fixing cylindrical portion 94 of the second wall 920 and the input shaft 60 of the transmission 6; thereby, the clutch drum 22 may integrally rotate with the input shaft 60 relative to the fixing cylindrical portion 94 around the rotational axis P1. A bearing 96c is arranged between the input member 20 and a radially inward portion of the first wall 910 of the first case 91; thereby, the input member 20 integrally rotates with the clutch drum 22 relative to the first ease 91 around the rotational axis P1. A bearing 96e is arranged between the output shaft 10 and the shaft portion 201. The clutch mechanism 2 and the clutch operation mechanism 3 are coaxially arranged with each other at an inner circumferential side of the motor 8 in the case 9 described above. Thus, an axial length of the motor 8 is effectively utilized and the clutch mechanism 2 and the clutch operation mechanism 3 may be arranged at the inner circumferential side of the motor 8. As a result, the size of the drive system in the direction of the rotational axis P1 may be reduced.

Operation of the drive system according to the first embodiment will be explained as follows. A driver of the vehicle turns on an ignition switch and presses an accelerator pedal (when the driver presses the accelerator pedal, an opening angle of a throttle valve is small). Then, the oil pump 78 serving as the electric pump powered by a battery is brought into operation and the hydraulic pressure is supplied to the pressurizing chamber 34. Thereafter, the clutch mechanism 2 is brought in the disconnected state and the excitation current is applied to the excitation wiring 80c of the motor 8 to therefore rotate the rotor 82. Further, the clutch drum 22 connected to the rotor 82 rotates in accordance with the rotation of the rotor 82 and the driving wheels are rotated by the transmission 6, therefore bringing the vehicle into motion.

When the vehicle is brought into motion as described above, the engine 1 may not start and therefore remains in a non-operational state. In such case, the vehicle is brought into motion only by a driving force of the motor 8. At this time, the ECU 7 commands the oil pump 78 to start moving to generate the hydraulic pressure. In addition, the control valve 70 is shifted to the second position 72. Accordingly, the oil is discharged from the oil pump 78 through the discharge port 78a to the passage 73c of the second position 72, therefore being supplied through the oil passage 35 to the pressurizing chamber 34. Consequently, the hydraulic pressure of the pressurizing chamber 34 increases, therefore moving the piston 32 in the direction F2. As a result, the clutch mechanism 2 corresponding to the normally closed clutch is shifted from the connected state to the disconnected state. Thus, in the case that the vehicle is brought into motion only by the motor 8, the engine 1, the flywheel 14, and the like are disconnected from the transmission 6, thereby improving startablity of the vehicle.

For example, in a state where the engine 1 is operating under a low or extremely low load, that is, in a state where the engine 1 is in a region where efficiency of the engine 1 is insufficient, it is appropriate that the operation of the engine 1 is stopped. In other words, in the case that the vehicle is under the low or extremely low load, it is recommended that the vehicle is driven into motion only by the motor 8. As described above, in the case that the operation of the engine 1 is stopped, the clutch mechanism 2 corresponding to the normally closed clutch is shifted from the connected state to the disconnected state. In such case, the oil is supplied from the passage 73c of the control valve 70 through the oil passage 35 to the pressurizing chamber 34 in accordance with the operation of the oil pump 78. Thereafter, the hydraulic pressure of the pressurizing chamber 34 becomes larger than the biasing forces of the biasing members 33, therefore moving the piston 32 in the direction F2 (see FIG. 3). Consequently, the friction plates 23 and the separate plates 24 adjoining one another to configure the clutch mechanism 2 separate from one another, therefore being brought into the disengaged state.

On the other hand, in a case where the vehicle accelerates or is driven on a climbing road surface, it is appropriate for the engine 1 to be brought into operation. For example, the driver presses the accelerator pedal in order for the vehicle to accelerate or to move on the climbing road surface and the opening angle of the throttle valve becomes larger than a predetermined opening angle. Then, a fuel injection device is brought into operation and a spark plug is ignited. In addition, the driven shaft of the starter motor is driven; thereby, the ring gear 12 of the flywheel 14 engaging with the driven shaft of the starter motor is rotated along with the flywheel 14 and the output shaft 10. Consequently, the engine 1 is brought into operation. When the engine 1 is driven as described above, the clutch mechanism 2 is maintained in the connected state. In such case, the control valve 70 is shifted to the first position 71. Accordingly, the oil of the oil pump 78 is supplied through the passage 73a of the control valve 7 and the oil passage 39 to the spring chamber 38, therefore increasing the hydraulic pressure of the spring chamber 38. In addition, the oil of the pressurizing chamber 34 is discharged from the oil passage 35 through the passage 73b of the control valve 70 to the oil storing portion 79. Accordingly, the biasing forces of the biasing members 33 formed by the biasing members including the coils become larger than the hydraulic pressure of the pressurizing chamber 34, and the piston 32 and the separate plates 24 move in the direction F1 (see FIG. 3). Consequently, the separate plates 24 are firmly pressed against the friction plates 23 so as to be engaged therewith. As a result, the driving force of the output shaft 10 of the engine 1 is transmitted by the clutch mechanism 2 to the input shaft 60 of the transmission 6. Thus, the driving force of the engine 1 and the driving force of the motor 8 are increased, thereby bringing the vehicle into motion by means of the large driving forces. For example, in a case where the vehicle is in a normal moving state, the efficiency of the engine 1 is high. Therefore, it is recommended that power feeding to the motor 8 is stopped in order to idle the motor 8. In the case that the power feeding to the motor 8 is stopped, the clutch mechanism 2 is maintained in the connected state and the driving force of the output shaft 10 of the engine 1 is transmitted by the clutch mechanism 2 to the input shaft 60 of the transmission 6, therefore bringing the vehicle 1 into motion by the driving force of the engine 1.

In the case of the electric power regeneration by the motor 8, for example, when the vehicle decelerates or in other cases, power feeding to the excitation wiring 80c of the motor 8 is stopped. In addition, a load applied to the rotor 82 is reduced in order that the clutch mechanism 2 is shifted from the connected state to the disconnected state for the purpose of disconnecting the output shaft 10 of the engine 1 from the input member 20 of the clutch mechanism 2. Therefore, the electric power regeneration efficiency of the motor 8 may be increased. In such case, the oil is supplied by the oil pump 78 to the pressurizing chamber 34; thereafter, the hydraulic pressure of the pressurizing chamber 84 becomes larger than the biasing forces of the biasing members 33. Accordingly, the piston 32 moves in the direction F2 (see FIG. 3), therefore separating the separate plates 24 from the friction plates 23 to bring the friction plates 23 and the separate plates 24 in the disconnected state. As described above, in the case of the electric power regeneration by the motor 8, the motor 8 functions as the generator and generates the electric power. The electric power generated by the motor 8 is stored in the battery.

According to the drive system of the first embodiment, in a state where the vehicle is in motion, the clutch drum 22 rotates along with the rotor 82 around the rotational axis P1 and receives a centrifugal force. Accordingly, when the clutch mechanism 2 is in the connected and disconnected states, the oil may remain in the pressurizing chamber 34 and the spring chamber 38. For example, in a case where the oil remains in either one of the pressurizing chamber 34 and the spring chamber 38, a centrifugal hydraulic pressure generated by a centrifugal force caused by the rotation of the input shaft 60 may affect the operational responsiveness and operational controllability of the clutch mechanism 2. In particular, in a condition where the input shaft 60 rotates at high speed, the centrifugal force increases. Accordingly, in a case where the vehicle is driven at high speed, the centrifugal force may further affect the operational responsiveness and operational controllability of the clutch mechanism 2.

According to the drive system of the first embodiment, in a state where the input shaft 60 is in rotation, the oil of the spring chamber 38 remains therein while being discharged through the bores 250 to the outer side of the spring chamber 38. Accordingly, the centrifugal hydraulic pressure FA1 generated by the centrifugal force caused by the oil remaining in the pressurizing chamber 34 may counteract the centrifugal hydraulic pressure FA2 generated by the centrifugal force caused by the oil remaining in the spring chamber 38 (see FIG. 4). In other words, the centrifugal hydraulic pressure FA1 and the centrifugal hydraulic pressure FA2 act in opposite directions from each other. Consequently, for example, in a case where the centrifugal hydraulic pressure FA1 is equal to the centrifugal hydraulic pressure FA2, the centrifugal hydraulic pressure FA1 and the centrifugal hydraulic pressure FA2 offset each other. In addition, even in a case where the centrifugal hydraulic pressure FA1 is not equal to the centrifugal hydraulic pressure FA2, the centrifugal hydraulic pressure FA1 and the centrifugal hydraulic pressure FA2 act in the opposite directions from each other. Accordingly, influences of the centrifugal hydraulic pressure FA1 and the centrifugal hydraulic pressure FA2 on the operational controllability of the clutch mechanism 2 may be further reduced. Consequently, even in the case where the centrifugal hydraulic pressure FA1 and the centrifugal hydraulic pressure FA2 are generated, mechanical influences of the biasing forces of the biasing members 33 arranged in the spring chamber 38 are greater than the influences of the centrifugal hydraulic pressure FA1 and the centrifugal hydraulic pressure FA2. Therefore, the influences of the centrifugal hydraulic pressure FA1 and the centrifugal hydraulic pressure FA2 may be minimized. As a result, a delay in the operational responsiveness of the clutch mechanism 2 due to the centrifugal hydraulic pressures FA1 and FA2 may be decreased, thereby improving the operational controllability of the clutch mechanism 2. Moreover, the both centrifugal hydraulic pressures FA1 and FA2 increase as a rotating speed of the input shaft 60 increases. On the other hand, the both centrifugal hydraulic pressures FA1 and FA2 decrease as the rotating speed of the input shaft GO decreases. Thus, even when the rotating speed of the input shaft 60 varies, the influences of the centrifugal hydraulic pressures FA1 and FA2 on the operational controllability of the clutch mechanism 2 may be appropriately cancelled, therefore increasing the operational controllability of the clutch mechanism 2. In addition, the drive system according to the first embodiment is adapted to the hybrid vehicle. Accordingly, the operational responsiveness of the clutch mechanism 2 when the clutch mechanism 2 shifts from the connected state to the disconnected state is improved in the case of the electric power regeneration by the motor 8. Consequently, the clutch mechanism 2 is promptly shifted from the connected state to the disconnected state and the engine 1 is therefore disconnected from the motor 8, thereby increasing the electric power regeneration efficiency of the motor 8.

According to the drive system of the first embodiment, as illustrated in FIG. 2, minimum and maximum diameters of the spring chamber 38 formed between the clutch drum 22 and the axial surface (second axial end surface) of the piston 32 are defined as minimum and maximum diameters D1 and D2. Each of the bores 250 is arranged between the minimum and maximum diameters D1 and D2 in the radial direction of the clutch drum 22. Accordingly, the oil of the spring chamber 38 may remain in a radially outward portion of the spring chamber 38 by the centrifugal force while being discharged through the bores 250 to the outer side of the spring chamber 38. Consequently, the centrifugal hydraulic pressure FA2 may be obtained in the spring chamber 38. As a result, the centrifugal hydraulic pressure FA1 generated by the centrifugal force caused by the oil remaining in the pressurizing chamber 34 may be offset or reduced by the centrifugal hydraulic pressure FA2 generated by the centrifugal force caused by the oil remaining in the spring chamber 38. In other words, the centrifugal hydraulic pressure FA1 may be cancelled by the centrifugal hydraulic pressure FA2. Ability of the bore 250 to discharge the oil (the ability will be hereinafter referred to as the oil discharge ability) is basically determined by the opening diameter of the bore 250 and the length L between the rotational axis P1 and the axial center of the bore 250 in the radial direction of the clutch drum 22. Accordingly, the opening diameter of the bore 250 and the length L are adjusted; thereby, the oil discharge ability of the bore 250 may be adjusted. Further, the centrifugal hydraulic pressure FA2 in the spring chamber 38 may be adjusted. In addition, the operational responsiveness of the clutch mechanism 2 when the clutch mechanism 2 shifts between the connected and disconnected states may be adjusted.

Further, according to the drive system of the first embodiment, as illustrated in FIG. 2, the clutch drum 22 includes the fixed cylindrical portion 220 fixed to the outer circumferential portion of the input shaft 60, the first extending portion 221 extending radially outwardly from the fixed cylindrical portion 220, the radially-inward cylindrical portion 222 extending from the first extending portion 221 toward the transmission 6 along the rotational axis P1, the second extending portion 223 extending radially outwardly from the radially-inward cylindrical portion 222, and the radially-outward cylindrical portion 224 extending from the second extending portion 223 toward the clutch mechanism 2 along the rotational axis P1. The clutch drum 22 forms the spring chamber 38 in which the biasing members 33 and the piston 82 are accommodated. Further, the clutch drum 22 includes the drum chamber 230 in which the biasing members 33, the piston 32, the fixed plate 31, and the separate plates 24 are accommodated in the mentioned order and are fixed by means of a fixing member 238 formed by a snap ring. Thus, the size (axial length) of the clutch drum 22 particularly in the direction of the rotational axis P1 may be reduced.

Furthermore, according to the drive system of the first embodiment, the biasing members 33 face the bores 250 in the spring chamber 38. The oil in the vicinity of the biasing members 33 is discharged through the bores 250 from the spring chamber 38. Accordingly, an influence of the oil remaining in the spring chamber 38 on operations of the biasing members 33 may be minimized. Consequently, the centrifugal hydraulic pressure FA2 generated by the centrifugal force caused by the oil remaining in the spring chamber 38 may be inhibited from affecting the operational controllability of the clutch mechanism 2. In addition, as described above, in the case that the oil remains in the pressurizing chamber 34, the centrifugal hydraulic pressure FA1 is generated by the centrifugal force caused by the oil remaining in the pressurizing chamber 34, thereby pressing the piston 32 in the direction F2 (see in FIG. 4). In such case, the clutch mechanism 2 maintained in the connected state may be released therefrom depending on circumstances. Therefore, a check valve may be arranged at the fixed plate 31 configuring a wall consisting a portion of the pressurizing chamber 34; thereby, the oil remaining in the pressurizing chamber 34 may be discharged therefrom through the check valve. The check valve includes an orifice having an opening to an outer side of the pressurizing chamber 34, and a valve member closing the orifice. The valve member of the check valve opens the orifice when the centrifugal force FA1 of the pressurizing chamber 34 increases. However, capability of the valve member to close the orifice is not stable; therefore, the operational controllability of the clutch mechanism 2 may not be surely obtained. In addition, in the case where the oil is supplied to the pressurizing chamber 34 to thereby bring the clutch mechanism 2 into the disconnected state, the orifice of the check valve opens and the oil supplied in the pressurizing chamber 34 may therefore leak from the orifice to the outer side of the pressurizing chamber 34. Therefore, a leakage volume of the oil from the pressurizing chamber 34 needs to be considered so that a volume of the oil to be supplied to the pressurizing chamber 34 may be increased. In such case, the size of the oil pump 78 may be inhibited from being increased.

Therefore, according to the drive system of the first embodiment, the check valve is not arranged at the fixed plate 31. Accordingly, the oil may not be discharged through the orifice of the check valve and therefore remains in the pressurizing chamber 34. As a result, the centrifugal hydraulic pressure FA1 may be generated in accordance with the rotation of the input shaft 60. However, according to the drive system of the first embodiment, in a state where the input shaft 60 is in rotation, the oil of the spring chamber 38 is allowed to remain therein while being discharged through the bores 250 to the outer side of the spring chamber 38 as described above. Accordingly, the centrifugal hydraulic pressure FA2 generated by the centrifugal force caused by the oil remaining in the spring chamber 38 may be generated so as to counteract the centrifugal hydraulic pressure FA1 generated by the centrifugal force caused by to the oil remaining in the pressurizing chamber 34. Consequently, the centrifugal hydraulic pressure FA1 in the pressurizing chamber 34 and the centrifugal hydraulic pressure FA2 in the spring chamber 38 may offset each other or reduce. As a result, the check valve may be inhibited from being arranged at the fixed plate 31 in the drive system according to the first embodiment and the influence of the centrifugal hydraulic pressure FA1 caused by the oil remaining in the pressurizing chamber 34 on the operational controllability of the clutch mechanism 2 may be reduced or cancelled. In addition, the check valve is not arranged at the fixed plate 31 in the drive system according to the first embodiment, therefore reducing the cost of the drive system. Moreover, since the check valve is not arranged at the fixed plate 31 in the drive system according to the first embodiment, the oil filled in the pressurizing chamber 34 in order to bring the clutch mechanism 2 into the disconnected state may not leak from the orifice of the check valve. Accordingly, the volume of the oil being supplied to the pressurizing chamber 34 may be appropriately adjusted. As a result, the size of the oil pump 78 may be inhibited from being increased, thereby increasing installability of the drive system relative to the vehicle.

In addition, according to the drive system of the first embodiment, as illustrated in FIG. 4, an outer circumferential portion 38p of the spring chamber 38 is positioned further outward than an outer circumferential portion 34p of the pressurizing chamber 34 in the radial direction of the clutch drum 22. Accordingly, a centrifugal hydraulic pressure caused by the oil in the vicinity of the outer circumferential portion 38p of the spring chamber 38 is larger than a centrifugal hydraulic pressure caused by the oil in the vicinity of the outer circumferential portion 34p of the pressurizing chamber 34. In such case, a driving force for moving the clutch mechanism 2 in the engagement direction may be effectively increased, thereby promptly bringing the clutch mechanism 2 into the connected state.

Moreover, according to the drive system of the first embodiment, as illustrated in FIG. 2, the rotor 82 is fixed to the outer circumferential portion of the radially-outward cylindrical portion 224 of the clutch drum 22 by means of the bracket 89c and the attachment members 89a. The attachment members 89a are attached to attachment bores 89k formed in the clutch drum 22. The attachment bores 89k face the spring chamber 38 in which the centrifugal hydraulic pressure FA2 is generated. Boundary portions between the attachment bores 89k and the attachment members 89a are sealed by a seal adhesive in order to obtain the centrifugal hydraulic pressure FA2; thereby, the oil in the spring chamber 38 is inhibited from leaking therefrom.

Additionally, according to the drive system of the first embodiment, as illustrated in FIG. 2, the oil storing portion 79 for storing the oil is formed at bottom portions (at a lower side seen in FIG. 2) of the first case 91 and the second case 92. The oil storing portion 79 serves as a reservoir for storing the oil of the oil pump 78. A level of the oil in a vertical direction in FIG. 2 is shown as an oil level 79x. A lower portion of the stator 80, a lower portion of the excitation wiring 80c, and a lower portion of the rotor 82 are immersed in the oil so as to be located under the oil level 79x in the vertical direction seen in FIG. 2. Accordingly, the stator 80, the excitation wiring 80c, and the rotor 82 may be cooled by the oil, thereby increasing operational and power generation efficiencies of the motor 8. As illustrated in FIG. 2, the oil level 79x is positioned slightly closer to an inner side in the radial direction of the clutch drum 22 than an outer circumferential side of the rotor 82, thereby inhibiting the rotor 82 from being excessively immersed in the oil. Accordingly, in a case where the rotor 82 is brought in rotation, rotational resistance of the rotor 82 is inhibited from excessively increasing, resulting in the improvement of the fuel efficiency of the vehicle. For example, the motor 8 is brought in operation, therefore rotating the rotor 82 to thereby splash a portion of the oil stored in the oil storing portion 79 over the friction plates 23 and the separate plates 24 of the clutch mechanism 2 that are in the connected and disconnected states. In addition, the rotor 82 allows a portion of the oil of the oil storing portion 79 to splash over the bearings 96a, 96c, and 96e, and the like. Thus, the friction plates 23, the separate plates 24, and the bearings 96a, 96c, and 96e, and the like may be cooled and lubricated by the oil. As a result, the operational and power generation efficiencies of the motor 8 are increased and durability of the drive system according to the first embodiment may be further increased.

Figure 6:
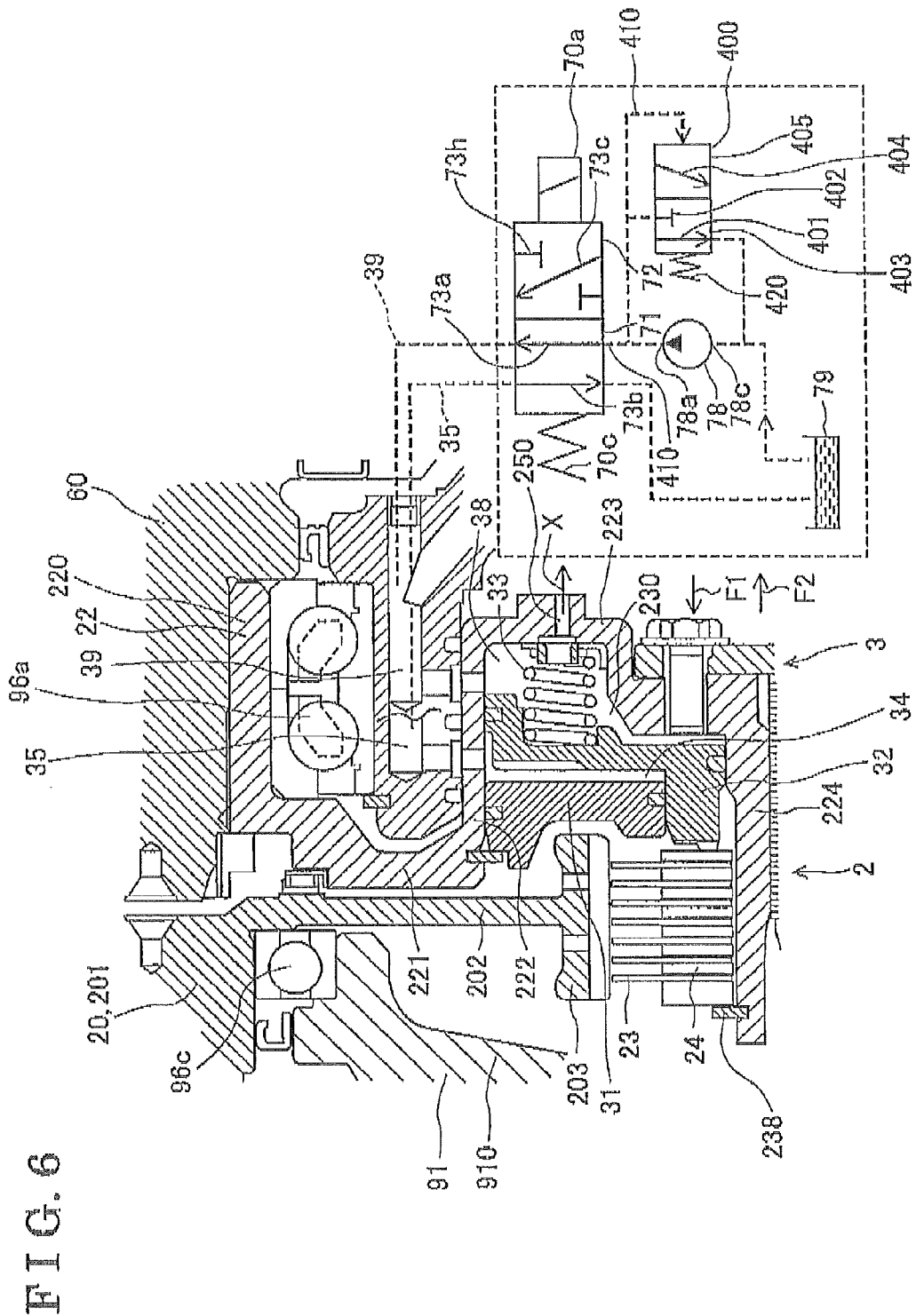
FIG. 6 is a partial cross sectional view illustrating a portion in the vicinity of the pressurizing chamber and the spring chamber that are in the clutch drum of the drive system according to a second embodiment disclosed here.

A second embodiment of the disclosure will be illustrated in FIG. 8. The drive system according to the second embodiment has substantially the same configuration and operational effects as those of the drive system according to the first embodiment. As shown in FIG. 6, the drive system according to the second embodiment differs from the drive system according to the first embodiment in that a relief valve 400 including a passage 410 is arranged between the discharge port 78a and a suction port 780 of the oil pump 78. The relief valve 400 is switchable between a first position 403 including a passage 401 and a closing port 402 and a second position 405 including a passage 404. The hydraulic pressure of the passage 410 connecting to the passages 73a and 73c counteracts a biasing force of a biasing member 420 of the relief valve 400. In a normal state, the biasing force of the biasing member 420 is larger than the hydraulic pressure of the passage 410, therefore setting the relief valve 400 in the first position 403. Meanwhile, in a case where the hydraulic pressure of the passage 410 connecting to the passages 73a and 73c excessively increases and therefore is larger than the biasing force of the biasing member 420, the relief valve 400 is shifted from the first position 403 to the second position 405. As a result, the oil in the passage 410 is discharged from the passage 404 of the second position 405 to the oil storing portion 79, thereby further increasing durability of the oil pump 78.

The drive system according to the first embodiment may be modified as follows. The drive system according to the first embodiment is arranged in the hybrid vehicle provided with the both engine 1 and the motor 8. Alternatively, the drive system according to the first embodiment may be arranged in a vehicle provided with the engine 1 but not provided with the motor 8. The configuration of the clutch operation mechanism 3 may be configured in a different manner from the configuration described in the first embodiment as long as the clutch operation mechanism 3 is configured to shift the clutch mechanism 2 between the connected and disconnected states. Further, according to the first embodiment, the first and second clutch portions (friction plates and separate plates) 23 and 24 of the clutch mechanism 2 have plate shapes. Alternatively, the first and second clutch portions may be formed in different shapes as long as the clutch mechanism 2 is configured so as to transfer the driving force of the engine 1 to the transmission 6 and so as to block the transmission of the driving force of the engine 1 to the transmission 6. As described above, according to the first embodiment, the friction plates 23 and the separate plates 24 that correspond to the first and second clutch portions, respectively, are adapted to the clutch mechanism 2. Alternatively, other members may be adapted to the clutch mechanism 2 instead of the first and second clutch portions (friction and separate plates) 23 and 24. Moreover, according to the first embodiment, the oil pump 78 serves as the electric pump. Alternatively, the oil pump 78 may be a pump mechanically driven by the engine 1 and the like. In addition, according to the first embodiment, in a case where the vehicle is started, the clutch mechanism 2 is shifted from the connected state to the disconnected state and the vehicle is brought into motion by the motor 8. Alternatively, the vehicle may be driven by the driving force of the engine 1 in addition to the driving force of the motor 8. The drive system of the disclosure is not limited to the first and second embodiments illustrated in the attached drawings and may be modified as required without departing from the scope of the disclosure.

As described above, according to each of the first and second embodiments, the drive system includes the engine 1 having the output shaft 10, the transmission 6 including the input shaft 60 to which the driving force of the output shaft 10 of the engine 1 is transmitted, the transmission 6 transmitting the driving force to the driving wheels of the vehicle, the clutch mechanism 2 including the friction plates 23 arranged between the output shaft 10 of the engine 1 and the input shaft 60 of the transmission 6 and positioned at the output shaft 10, and the separate plates 24 arranged at the input shaft 60, the clutch mechanism 2 being switchable between the connected state where the friction plates 23 and the separate plates 24 are engaged with one another to transmit the driving force of the engine 1 to the transmission 6 and the disconnected state where the friction plates 23 and the separate plates 24 are disengaged from one another to block the transmission of the driving force of the engine 1 to the transmission 6, and the clutch operation mechanism 3 switching the clutch mechanism 2 between the connected state and the disconnected state by the supply and discharge of the oil to and from the clutch mechanism 2, the clutch operation mechanism 3 including the clutch drum 22 supported by the input shaft 60 or the output shaft 10 and having the cylindrical shape to form the drum chamber 230, the piston 32 dividing the drum chamber 230 of the clutch drum 22 into the spring chamber 38 generating the driving force for engaging the friction plates 23 and the separate plates 24 with one another, and the pressurizing chamber 34 generating the driving force for disengaging the friction plates 23 and the separate plates 24 from one another, the control valve 70 being switchable between the first position 71 allowing the supply of the oil to the spring chamber 38 and the second position 72 allowing the supply of the oil to the pressurizing chamber 34, the biasing members 33 arranged in the spring chamber 38 and exerting the biasing force in the direction in which the friction plates 23 and the separate plates 24 are engaged with one another, and the bores 250 formed in the clutch drum 22 to establish a connection between the inner and outer sides of the spring chamber 38, the bores 250 discharging the oil of the spring chamber 38 from the inner side to the outer side in a state where the counteracting force against the centrifugal force acting in the pressurizing chamber 34 is generated in the spring chamber 38.

According to the aforementioned configuration of the drive system of each of the first and second embodiments, the biasing members 33 exerting the biasing force in the direction in which the friction plates 23 and the separate plates 24 are engaged with (connected to) one another are arranged in the spring chamber 38. For example, in a state where the input shaft 60 of the transmission 6 is in rotation, the oil is supplied to the spring chamber 38. Consequently, the hydraulic pressure of the spring chamber 38 and the mechanical biasing forces of the biasing members 33 may serve as the driving forces for bringing the friction plates 23 and the separate plates 24 into the connected state. As a result, the friction plates 23 and the separate plates 24 are promptly engaged with one another, therefore increasing the operational responsiveness of the clutch mechanism 2 when the clutch mechanism 2 shifts from the disconnected state to the connected state.

For example, in a case where the oil remains in either one of the pressurizing chamber 34 and the spring chamber 38, the centrifugal force caused by the rotation of the input shaft 60 may affect the operational responsiveness and operational controllability of the clutch mechanism 2. In particular, in a condition where the input shaft 60 rotates at high speed, the centrifugal force increases. Accordingly, in a case where the vehicle is driven at high speed, the centrifugal force may further affect the operational responsiveness and operational controllability of the clutch mechanism 2. According to the configuration of the drive system of each of the first and second embodiments, in a state where the input shaft 60 is in rotation, the oil of the spring chamber 38 is allowed to remain therein while being discharged through the bores 250 to the outer side of the spring chamber 38. Accordingly, the centrifugal hydraulic pressure FA2 generated by the centrifugal force caused by the oil remaining in the spring chamber 38 may counteract the centrifugal hydraulic pressure FA1 generated by the centrifugal force caused by the oil remaining in the pressurizing chamber 34. In particular, the centrifugal hydraulic pressures FA1 and FA2 act in the opposite directions from each other. Accordingly, in a case where the centrifugal hydraulic pressure FA1 is equal to the centrifugal hydraulic pressure FA2, the centrifugal hydraulic pressure FA1 and the centrifugal hydraulic pressure FA2 offset each other. On the other hand, in a case where the centrifugal hydraulic pressure FA1 is not equal to the centrifugal hydraulic pressure FA2, the centrifugal hydraulic pressure FA1 and the centrifugal hydraulic pressure FA2 act in the opposite directions from each other as described above. Accordingly, the influences of the centrifugal hydraulic pressure FA1 and the centrifugal hydraulic pressure FA2 on the operational controllability of the clutch mechanism 2 may be reduced. Consequently, the influence of the biasing forces of the biasing members 33 arranged in the spring chamber 38 become larger than the influences of the centrifugal hydraulic pressure FA1 and the centrifugal hydraulic pressure FA2. Therefore, the influences of the centrifugal hydraulic pressure FA1 and the centrifugal hydraulic pressure FA2 are minimized, therefore improving the operational responsiveness of the clutch mechanism 2 when the clutch mechanism 2 shifts between the connected and disconnected states. Moreover, the both centrifugal hydraulic pressures FA1 and FA2 increase as the rotating speed of the input shaft 60 increases. However, as described above, the centrifugal hydraulic pressures FA1 and FA2 act in the opposite directions from each other and offset each other or decrease. Accordingly, even when the input shaft 60 rotates at high speed, the appropriate operational responsiveness and operational controllability of the clutch mechanism 2 may be secured.

In addition, the check valve for discharging the oil remaining in the pressurizing chamber 34 therefrom may be arranged at the wall consisting a portion of the pressurizing chamber 34. However, the operation of the check valve is not stable; therefore, the operational controllability of the clutch mechanism 2 may not be surely obtained. As described above, according to drive system of the first embodiment, the centrifugal hydraulic pressure FA2 counteracting the centrifugal hydraulic pressure FA1 of the pressurizing chamber 34 may be generated. Accordingly, the check valve does not need to be arranged at the wall of the pressurizing chamber 34 in the drive system according to the first embodiment. Moreover, for example, in a case where the drive system according to the first embodiment is adapted to the hybrid vehicle, the operational responsiveness of the clutch mechanism 2 when the clutch mechanism 2 shifts from the connected state to the disconnected state is increased at the time of the electric power regeneration by the motor 8. As a result, the engine 1 is promptly disconnected from the transmission 6, thereby increasing the electric power regeneration efficiency of the motor 8.

According to each of the aforementioned first and second embodiments, the spring chamber 38 has the minimum diameter D1 and the maximum diameter D2, and each of the bores 250 is arranged between the minimum diameter D1 and the maximum diameter D2 in the radial direction of the clutch drum 22.

According to the aforementioned configuration of the drive system of each of the first and second embodiments, the oil of the spring chamber 38 is allowed to remain therein while being discharged through the bores 250 to the outer side of the spring chamber 38. Accordingly, the centrifugal hydraulic pressure FA2 may be obtained in the spring chamber 38. Consequently, the centrifugal hydraulic pressure FA1 generated by the centrifugal force caused by to the oil remaining in the pressurizing chamber 34 may be offset or reduced by the centrifugal hydraulic pressure FA2 in the spring chamber 38.

According to each of the aforementioned first and second embodiments, the clutch drum 22 includes the fixed cylindrical portion 220 fitted to the outer circumferential portion of the input shaft 60, the first extending portion 221 extending radially outwardly from the fixed cylindrical portion 220, the radially-inward cylindrical portion 222 formed to extend along the rotational axis P1, the second extending portion 223 extending radially outwardly from the radially-inward cylindrical portion 222, and the radially-outward cylindrical portion 224 formed to extend along the rotational axis P1. Further, the radially-inward cylindrical portion 222, the second extending portion 223, and the radially-outward cylindrical portion 224 form the drum chamber 230 in which the biasing members 33 and the piston 32 are accommodated.

As described above, the piston 32, the biasing members 33, and the like are accommodated in the drum chamber 230 of the clutch drum 22, thereby reducing the size of the drive system in the direction of the rotational axis P1.

According to each of the aforementioned first and second embodiments, the motor 8 functioning to drive the vehicle and serving as the generator is arranged in the drive-train connecting the friction plates 23 and the separate plates 24 to the transmission 6. The motor 8 includes the stator 80 and the rotor 82. The rotor 82 rotating relative to the stator 80 and outputting the rotating force. The rotating force is transmitted to the input shaft 60 of the transmission 6. The stator 80 and the rotor 82 are coaxially arranged with each other at the outer circumferential side of the friction plates 23 and the separate plates 24.

As described above, the motor 8 functioning to drive the vehicle and serving as the generator is arranged in the drive-train connecting the clutch mechanism 2 to the transmission 6. Accordingly, even in a case where the clutch mechanism 2 is shifted from the connected state to the disconnected state to block the transmission of the driving force of the engine 1 to the transmission 6, the driving force of the motor 8 is transferred to the input shaft 60 of the transmission 6, thereby rotating the input shaft 60. As a result, the vehicle may be brought into motion by the driving force of the motor 8 in a state where the operation of the engine 1 is stopped.

According to each of the aforementioned first and second embodiments, the biasing members 33 face the bores 250 in the spring chamber 38.

Accordingly, the oil in the vicinity of the biasing members 33 in the spring chamber 38 is discharged through the bores 250 to the outer side of the spring chamber 38; thereby, the operation of the biasing members 33 is inhibited from being influenced by the oil remaining in the spring chamber 38. Consequently, the operational controllability of the clutch mechanism 2 may be increased.

According to the configuration of the drive system of each of the aforementioned first and second embodiments, for example, in a state where the input shaft 60 of the transmission 6 is in rotation, the oil of the spring chamber 38 remains therein while being discharged therefrom through the bores 250. As a result, the centrifugal hydraulic pressure FA2 (the counteracting force) counteracting the centrifugal force acting in the pressurizing chamber 34 may be obtained in the spring chamber 38. Here, in a case where the centrifugal hydraulic pressure FA1 is equal to the centrifugal hydraulic pressure FA2, the centrifugal hydraulic pressure FA1 and the centrifugal hydraulic pressure FA2 offset each other. Meanwhile, even in a case where the centrifugal hydraulic pressure FA1 is not equal to the centrifugal hydraulic pressure FA2, the centrifugal hydraulic pressure FA1 and the centrifugal hydraulic pressure FA2 act in the opposite directions from each other. Accordingly, the influences of the centrifugal hydraulic pressure FA1 and the centrifugal hydraulic pressure FA2 on the operational controllability of the clutch mechanism 2 may be further reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A drive system for a vehicle, comprising:
an engine including an output shaft;
a transmission including an input shaft to which a driving force of the output shaft of the engine is transmitted, the transmission transmitting the driving force to driving wheels of the vehicle;
a clutch mechanism including a first clutch portion arranged between the output shaft of the engine and the input shaft of the transmission and positioned at the output shaft, and a second clutch portion arranged at the input shaft, the clutch mechanism being switchable between a connected state where the first clutch portion and the second clutch portion are engaged with each other to transmit the driving force of the engine to the transmission and a disconnected state where the first clutch portion and the second clutch portion are disengaged from each other to block the transmission of the driving force of the engine to the transmission; and a clutch operation mechanism switching the clutch mechanism between the connected state and the disconnected state by supply and discharge of oil to and from the clutch mechanism, the clutch operation mechanism including a clutch drum supported by the input shaft or the output shaft and having a cylindrical shape to form a drum chamber, a piston dividing the drum chamber of the clutch drum into a spring chamber generating a driving force for engaging the first clutch portion and the second clutch portion with each other, and a pressurizing chamber generating a driving force for disengaging the first clutch portion and the second clutch portion from each other, a control valve being switchable between a first position allowing the supply of the oil to the spring chamber and a second position allowing the supply of the oil to the pressurizing chamber, a biasing member arranged in the spring chamber and exerting a biasing force in a direction in which the first clutch portion and the second clutch portion are engaged with each other, and a bore formed in the clutch drum to establish a connection between inner and outer sides of the spring chamber, the bore discharging the oil of the spring chamber from the inner side to the outer side in a state where a counteracting force against a centrifugal force acting in the pressurizing chamber is generated in the spring chamber.

2. The drive system according to claim 1, wherein the spring chamber has minimum and maximum diameters, and the bore is arranged between the minimum and maximum diameters in a radial direction of the clutch drum.

3. The drive system according to claim 1, wherein the clutch drum includes a fixed cylindrical portion fitted to an outer circumferential portion of the input shaft, a first extending portion extending radially outwardly from the fixed cylindrical portion, a radially-inward cylindrical portion formed to extend along a rotational axis of the input shaft, a second extending portion extending radially outwardly from the radially-inward cylindrical portion, and a radially-outward cylindrical portion formed to extend along the rotational axis, and wherein the radially-inward cylindrical portion, the second extending portion, and the radially-outward cylindrical portion form a drum chamber in which the biasing member and the piston are accommodated.

4. The drive system according to claim 1, wherein a drive motor functioning to drive the vehicle and serving as a generator is arranged in a drive-train connecting the clutch mechanism to the transmission, the drive motor including a stator and a rotor, the rotor rotating relative to the stator and outputting a rotating force, the rotating force being transmitted to the input shaft of the transmission, and wherein the stator and the rotor are coaxially arranged with each other at an outer circumferential side of the clutch mechanism.

5. The drive system according to claim 1, wherein the biasing member faces the bore in the spring chamber.

6. A drive system for a vehicle, comprising:

an input member rotatably connected to a drive source;

a shaft member arranged coaxially with the input member along a rotational axis of the input member and connected to a transmission;

first clutch portions movably engaged with one of the input member and the shaft member along the rotational axis;

second clutch portions arranged in an alternating manner with the first clutch portions and being engageable with and disengageable from the first clutch portions, the second clutch portions being movably engaged with the other one of the input member and the shaft member along the rotational axis;

a clutch drum supported by the input member or the shaft member and including a bore positioned away from the rotational axis by a predetermined length in a radial direction, the clutch drum connecting to an outer side via the bore;

a piston slidably fitted to the clutch drum along the rotational axis and including a pressing portion pressing the first clutch portions and the second clutch portions;

a biasing member arranged between the piston and the clutch drum and biasing the piston toward the first clutch portions and the second clutch portions, the biasing member firmly pressing the first clutch portions and the second clutch portions against one another by the pressing portion;

a pressurizing chamber defined between the clutch drum and a first axial end surface of the piston; and a spring chamber defined between the clutch drum and a second axial end surface of the piston, the piston separating from the first clutch portions and the second clutch portions against a biasing force of the biasing member by a hydraulic pressure of oil supplied to the pressurizing chamber, the oil being discharged from the spring chamber through the bore of the clutch drum to an outer side of the spring chamber.

7. The drive system according to claim 6, wherein the spring chamber has minimum and maximum diameters, and the bore is arranged between the minimum and maximum diameters in a radial direction of the clutch drum.

8. The drive system according to claim 6, wherein the clutch drum includes a fixed cylindrical portion fitted to an outer circumferential portion of the input shaft, a first extending portion extending radially outwardly from the fixed cylindrical portion, a radially-inward cylindrical portion formed to extend along the rotational axis, a second extending portion extending radially outwardly from the radially-inward cylindrical portion, and a radially-outward cylindrical portion formed to extend along the rotational axis, and wherein the radially-inward cylindrical portion, the second extending portion, and the radially-outward cylindrical portion form a drum chamber in which the biasing member and the piston are accommodated.

9. The drive system according to claim 6, wherein the biasing member faces the bore in the spring chamber.

* * * * *